United States Patent
Sakai et al.

(10) Patent No.: US 7,097,932 B1
(45) Date of Patent: Aug. 29, 2006

(54) POLYMER ELECTROLYTIC FUEL CELL AND METHOD FOR PRODUCING THE SAME

(75) Inventors: Osamu Sakai, Neyagawa (JP); Hisaaki Gyoten, Shijonawate (JP); Hiroki Kusakabe, Sakai (JP); Eiichi Yasumoto, Kyoto (JP); Yasushi Sugawara, Higashiosaka (JP); Teruhisa Kanbara, Toyonaka (JP); Akihiko Yoshida, Hirakata (JP); Makoto Uchida, Hirakata (JP); Junji Morita, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 172 days.

(21) Appl. No.: 10/088,484

(22) PCT Filed: Sep. 20, 2000

(86) PCT No.: PCT/JP00/06451

§ 371 (c)(1),
(2), (4) Date: Mar. 20, 2002

(87) PCT Pub. No.: WO01/22514

PCT Pub. Date: Mar. 29, 2001

(30) Foreign Application Priority Data

Sep. 21, 1999  (JP) .................................. 11-266803
Sep. 29, 1999  (JP) .................................. 11-275762
Oct. 27, 1999  (JP) .................................. 11-305990

(51) Int. Cl.
*H01M 4/96* (2006.01)
(52) U.S. Cl. .............................. 429/40; 429/41; 429/42

(58) Field of Classification Search .................. 429/40, 429/41, 42
See application file for complete search history.

(56) References Cited

U.S. PATENT DOCUMENTS

| 4,444,852 A | 4/1984 | Liu et al. |
| 5,211,984 A | 5/1993 | Wilson |
| 5,318,862 A | 6/1994 | Liu et al. |

(Continued)

FOREIGN PATENT DOCUMENTS

| DE | 88 122 A | 7/1970 |
| DE | 88122 | 11/1972 |
| DE | 196 47 534 | 5/1998 |

(Continued)

*Primary Examiner*—Dah-Wei Yuan
(74) *Attorney, Agent, or Firm*—McDermott Will & Emery LLP

(57) ABSTRACT

A polymer electrolyte fuel cell is provided comprising: a hydrogen ion conductive polymer electrolyte membrane; an anode and a cathode sandwiching the hydrogen ion conductive polymer electrolyte membrane; an anode side electroconductive separator having a gas channel for supplying a fuel gas to the anode; a cathode side electroconductive separator having a gas channel for supplying an oxidant gas to the cathode; characterized in that the anode and the cathode comprise a gas diffusion layer and a catalyst layer formed on the gas diffusion layer at the side in contact with the hydrogen ion conductive polymer electrolyte membrane, the catalyst layer has catalyst particles and a hydrogen ion conductive polymer electrolyte, and at least either of hydrogen ion conductivity and gas permeability of at least either of the anode and the cathode varies in a thickness direction of the anode or the cathode.

8 Claims, 12 Drawing Sheets

U.S. PATENT DOCUMENTS

| | | |
|---|---|---|
| 5,501,915 A | 3/1996 | Hards et al. |
| 5,523,177 A | 6/1996 | Kosek et al. |
| 5,843,519 A | 12/1998 | Tada et al. |
| 5,874,182 A | 2/1999 | Wilkinson et al. |
| 5,882,810 A | 3/1999 | Mussell et al. |

FOREIGN PATENT DOCUMENTS

| | | |
|---|---|---|
| EP | 0 687 023 A1 | 12/1995 |
| EP | 0 972 807 A1 | 10/1998 |
| EP | 0 928 038 A1 | 7/1999 |
| JP | 61-295387 | 12/1986 |
| JP | 3-130150 | 12/1991 |
| JP | 5-36418 | 2/1993 |
| JP | 5-182671 | 7/1993 |
| JP | 7-183035 | 7/1995 |
| JP | 08-088008 A | 4/1996 |
| JP | 8-96813 | 4/1996 |
| JP | 9-245801 | 9/1997 |
| JP | 09-245801 * | 9/1997 |
| JP | 9-245802 | 9/1997 |
| JP | 10-92440 | 4/1998 |
| JP | 10-189004 | 7/1998 |
| JP | 10270051 | 9/1998 |
| WO | WO 99/40237 | 8/1999 |

* cited by examiner

FIG. 6
A2
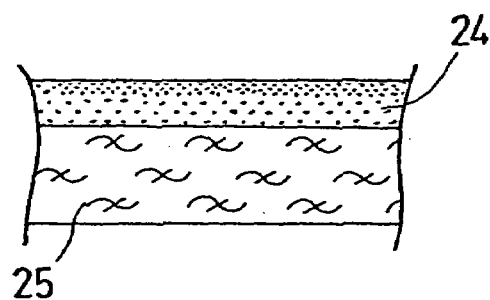
B2
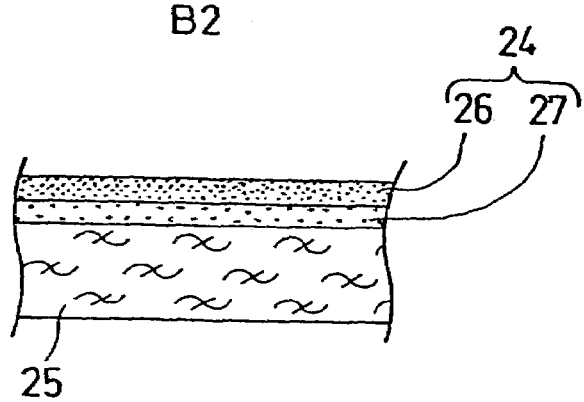
C2
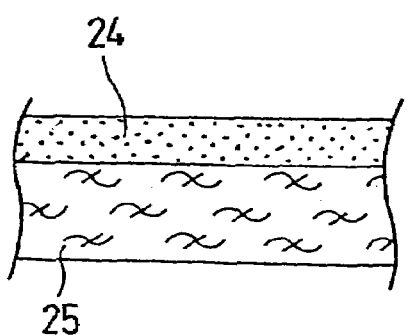

US 7,097,932 B1

POLYMER ELECTROLYTIC FUEL CELL AND METHOD FOR PRODUCING THE SAME

RELATED APPLICATIONS

This application claims benefit to PCT International Paten Application No. PCT/JP00/06451, filed on 20 Sep. 2000.

TECHNICAL FIELD

The present invention relates to polymer electrolyte fuel cells useful as consumer co-generation systems and mobile power-generating appliances.

BACKGROUND ART

In the electrodes of fuel cells, a fuel gas such as hydrogen and an oxidant gas such as air react electrochemically to generate electricity and heat simultaneously. Owing to the variety of electrolytes with which they are equipped, there are several types of fuel cells.

FIG. 1 is a sectional view illustrating a structure of conventional polymer electrolyte fuel cells. Polymer electrolyte fuel cells comprise electrolyte membrane-electrode assemblies 5 (MEAs), comprising a hydrogen ion conductive polymer electrolyte membrane 1 and a pair of electrodes 4 sandwiching the membrane. The pair of electrodes comprise an anode and a cathode, wherein a fuel gas is supplied to the anode and an oxidant gas is supplied to the cathode. The polymer-electrolyte membrane, for example, has a —$CF_2$-skeleton and comprises a perfluorocarbon sulfonate having sulfonic acids on the terminal ends of its side chains.

The anode and the cathode comprise a catalyst layer 2 contiguous with the hydrogen ion conductive polymer electrolyte membrane and a gas diffusion layer 3 having gas-permeability and electroconductivity arranged on the outer face of the catalyst layer.

Electroconductive separators 7 for affixing an MEA, and at the same time electrically interconnecting in series neighboring MEAs, are arranged on the outer faces of the MEA. The electroconductive separator has a gas channel 6 for supplying the fuel gas or the oxidant gas to the anode or the cathode, and for conveying a surplus gas and water created by the reaction of hydrogen and oxygen. The gas channels can be provided independently of the electroconductive separator, but the gas channel is generally formed by providing ribs or grooves on the surface of the electroconductive separator.

A cooling water channel 8 can be formed on some of the electroconductive separators. For example, electroconductive separators, each having a gas channel on one side thereof and a prescribed groove on the other side thereof, are bonded together with a sealant 10 in such a manner that the side having the gas channel faces outside, thereby the prescribed grooves form a cooling water channel as shown in FIG. 1.

Gaskets 9 are arranged between both peripheries of the electroconductive separators and the MEA, in order to prevent gases from mixing with each other and from leaking outside.

To increase output voltage in procuring power-generating devices, a plurality of unit cells, comprising an MEA and a pair of electroconductive separators having gas channels, are laminated. A fuel gas or an oxidant gas is supplied from the exterior through a manifold to the inlet of the gas channel within each unit cell. Electric current generated through the electrode reactions is then collected to the gas diffusion layers and taken out to the exterior through the electroconductive separators.

During the operation of the cell, for example, oxygen moves from the gas channel to the catalyst layer through the gas diffusion layer in the cathode while hydrogen moves from the gas channel to the catalyst layer through the gas diffusion layer in the anode. Herein, if the contact between the catalyst particles and the hydrogen ion conductive polymer electrolyte in the catalyst layer is insufficient, the reaction area becomes small, leading to deterioration of discharging performance of the cell.

Conversely, water produced through the cell reaction moves from the catalyst layer to the gas channel through the gas diffusion layer to be removed outside of the cell with the surplus gas. If the gas diffusion layer does not have proper gas permeability, the polymer electrolyte membrane cannot be kept wet in a proper degree. If the water content in the polymer electrolyte membrane is decreased, its hydrogen ion conductivity will be lowered. On the other hand, if the water content in the polymer electrolyte membrane is extremely high, condensed water will clog micropores of the gas diffusion layer or gas channels of the electroconductive separators, resulting in considerable degradation of the cell performance. This condition is called "flooding".

Therefore, the contact condition of the catalyst particles with the hydrogen ion conductive polymer electrolyte and the gas permeability in the anode and the cathode considerably affect discharging performance of the fuel cell.

In order to enlarge the reaction area of the anode and the cathode, it is effective that the hydrogen ion conductive polymer electrolyte is included in the catalyst layer (Japanese Examined Patent Publication No. Sho 62-61118, U.S. Pat. No. 5,211,984). Likewise, in order to increase gas permeability of the anode and the cathode, it is effective that a water-repellent is included in the catalyst layer (Japanese Laid-Open Patent Publication No. Hei 5-36418, J. Electroanal. Chem. 197, 195(1986)). Therefore, the catalyst layer generally contains catalyst particles, a hydrogen ion conductive polymer electrolyte and, if necessary, water repellent. Further, carbon powders carrying a platinum-group metal are utilized as the catalyst particles.

Generally, the anode and the cathode are obtained by forming a catalyst layer on one side of the gas diffusion layer. The catalyst layer is usually formed by applying an ink, which comprises catalyst particles, a dispersion of a hydrogen ion conductive polymer electrolyte and an organic solvent such as isopropyl alcohol, onto the gas diffusion layer by using a screen printing method or a transfer printing method. The above-mentioned ink normally contains a pore-producing agent, but the pore-producing agent is to be removed during calcination of the electrode after forming the catalyst layer; thereby, micropores for passing a gas through are formed inside of the catalyst layer. The catalyst layer thus obtained has a constant mixing ratio of the catalyst particles to the hydrogen ion conductive polymer electrolyte in its thickness direction.

Conventional polymer electrolyte fuel cells as mentioned above have following problems.

First, it is considered to be effective that the mixing ratio of catalyst particles to a hydrogen ion conductive polymer electrolyte in a thickness direction of the catalyst layer varies in the thickness direction of the catalyst layer in order for hydrogen ions and electrons in the catalyst layer to move smoothly. It would be theoretically possible to vary the structure of the catalyst layer step by step, by preparing a plurality of inks each having different compositions and applying them over and over using a screen printing method or a transfer printing method, but it is practically very difficult and such a catalyst layer is not yet obtained, let alone seamlessly varying the structure of the catalyst layer by a screen printing method or a transfer printing method.

Conventional production process of anode and cathode has a problem of becoming complicated because it has a calcination process or a washing process for removing a pore-forming agent.

If an ink containing a solvent such as alcohols is screen-printed on a porous conductive base material, the ink is permeated inside the base material or passes through the base material. Accordingly, there is also a problem that a catalyst layer cannot be formed directly on the surface of a porous conductive base material. On the other hand, if an ink is screen-printed on a polymer electrolyte membrane, there are problems such as the polymer electrolyte membrane is swelled with the solvent in the ink and the polymer electrolyte membrane is difficult to be fixed on a device.

If catalyst particles and a water repellent or a carbon powder which is made water repellent are mixed with a dispersion of a polymer electrolyte, a plenty of the polymer electrolyte is adsorbed on the surface of the water repellent or the carbon powder which is made water repellent. Therefore, the contact condition of the polymer electrolyte with the catalyst particles becomes uneven and sufficient reaction area cannot be retained. Further, if a water repellent is added to an ink, catalyst particles are excessively covered with the water repellent, thereby decreasing a reaction area.

Since porous conductive base materials such as carbon paper, carbon cloth and carbon felt are conventionally used as the gas diffusion layer, it is difficult to adjust the porosity of the gas diffusion layer to the appropriate range.

As constant pressure is applied to the unit cells in laminating direction in order to decrease the contact resistance of each part and ensuring the gas sealing property, there is also such a problem that, if porosity of the gas diffusion layer is too large, the gas diffusion layer is crushed at the portion where the electroconductive separator and the gas diffusion layer are in contact and the gas permeability of the gas diffusion layer turns out to be uneven in a plane direction.

DISCLOSURE OF INVENTION

In view of the foregoing problems, it is an object of the present invention to provide a polymer electrolyte fuel cell having a large reaction area and proper gas permeability, which demonstrates high discharging performance even when the cell is operated at a high current density.

The present invention relates to a polymer electrolyte fuel cell comprising: a hydrogen ion conductive polymer electrolyte membrane; an anode and a cathode sandwiching the hydrogen ion conductive polymer electrolyte membrane; an anode side electroconductive separator having a gas channel for supplying a fuel gas to the anode; a cathode side electroconductive separator having a gas channel for supplying an oxidant gas to the cathode; characterized in that the anode and the cathode comprise a gas diffusion layer and a catalyst layer formed on the gas diffusion layer at the side in contact with the hydrogen ion conductive polymer electrolyte membrane, the catalyst layer has catalyst particles and a hydrogen ion conductive polymer electrolyte, at least either of hydrogen ion conductivity and gas permeability of at least either of the anode and the cathode varies in a thickness direction of the anode or the cathode.

The amount of the hydrogen ion conductive polymer electrolyte may be varied in a thickness direction of the catalyst layer in order that the hydrogen ion conductivity of at least either of the anode and the cathode is varied in the thickness direction of the anode or the cathode.

It is preferable that the amount of the hydrogen ion conductive polymer electrolyte in the catalyst layer is large at the hydrogen ion conductive polymer electrolyte membrane side and is small at the gas diffusion layer side.

It is also preferable that the catalyst layer comprises a layer comprising the catalyst particles and a layer, which is not in contact with the hydrogen ion conductive polymer electrolyte membrane, comprising the hydrogen ion conductive polymer electrolyte.

It is more preferable that the catalyst layer comprises the layer comprising the catalyst particles and the layer comprising the hydrogen ion conductive polymer electrolyte that are alternately laminated.

It is preferable that the porosity of the gas diffusion layer is high at the electroconductive separator side and low at the catalyst layer side.

It is also preferable that the gas diffusion layer has a plurality of porous conductive base materials each having different porosities.

The present invention also relates to a producing method of the polymer electrolyte fuel cell comprising a step of preparing a plurality of catalyst-layer-forming inks having different mixing ratios of the catalyst particles to the hydrogen ion conductive polymer electrolyte, by mixing the catalyst particles and the hydrogen ion conductive polymer electrolyte with a dispersion medium, and a step of forming a catalyst layer in which hydrogen ion conductivity varies in a thickness direction, by alternately applying the plurality of catalyst layer-forming inks on one side of the gas diffusion layer or at least one side of the hydrogen ion conductive polymer electrolyte membrane.

It is preferable that the catalyst-layer-forming inks contain carbon particles that are made water repellent.

It is preferable that the producing method of the polymer electrolyte fuel cell comprises a step of forming a gas diffusion layer, in which gas permeability varies in a thickness direction, by laminating a plurality of porous conductive base materials having different porosities.

It is also preferable that the producing method of the polymer electrolyte fuel cell comprises a step of making a surface, which is supposed to be in contact with the catalyst layer, of the gas diffusion layer water repellent.

It should be noted that the electroconductive separator may have a gas channel for supplying an oxidant gas to the cathode on one side thereof and a gas channel for supplying a fuel gas to the anode on the other side thereof.

BRIEF DESCRIPTION OF DRAWINGS

FIG. 6 is schematic sectional views of electrodes of unit cells A2, B2 and C2 in Examples 4 and 5 and Comparative Example 2 of the present invention.

BEST MODE FOR CARRYING OUT THE INVENTION

Embodiment 1

Figure 1:
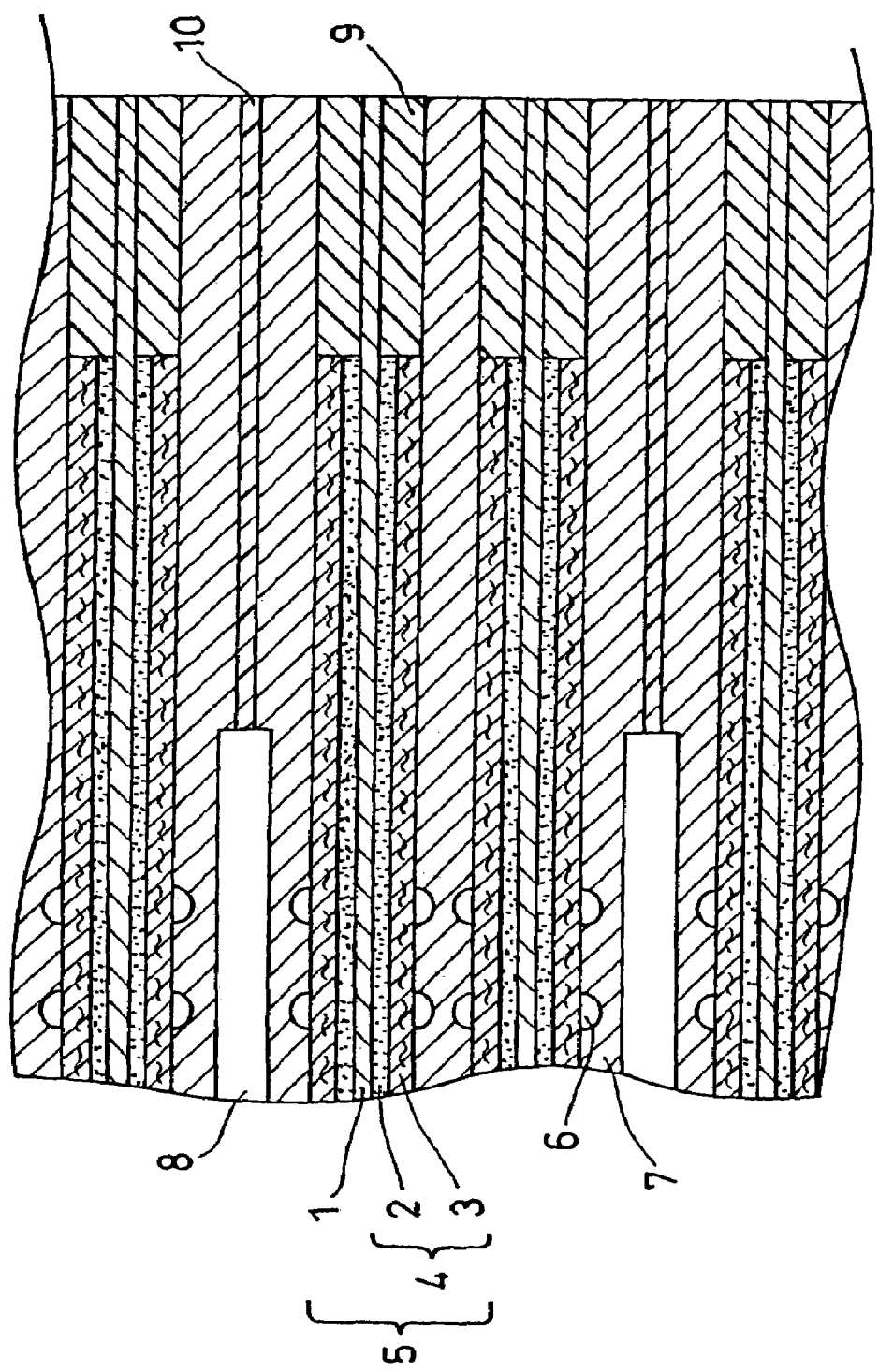
FIG. 1 is a sectional view illustrating a configuration of a conventional polymer electrolyte fuel cell.

The catalyst layer in accordance with the present embodiment comprises a layer comprising catalyst particles facilitating the reaction of a fuel gas and an oxidant gas, and a layer comprising a hydrogen ion conductive polymer electrolyte. The layer comprising catalyst particles may contain a water repellent or a carbon powder which is made water repellent; in such a case, it is preferable that the layer does not contain a hydrogen ion conductive polymer electrolyte. On the other hand, it is preferable that the layer comprising a hydrogen ion conductive polymer electrolyte does not contain a water repellent or a carbon powder which is made water repellent.

Alternate lamination of the layer comprising catalyst particles and the layer comprising a hydrogen ion conductive polymer electrolyte allows sufficient amount of the hydrogen ion conductive polymer electrolyte to exist on the surface of the catalyst particles, resulting in an increased reaction area of the catalyst layer.

The catalyst particles comprise a metal catalyst and its carrier. Platinum-group metals such as platinum, nickel and palladium; ruthenium; iridium; iron; tin and the like are preferably used as the catalyst metal. A carbon powder is preferably utilized as the carrier. It is preferable that the mean particle size of the carrier is from 10 to 50 nm from the viewpoint of enlarging the reaction area. Likewise, it is preferable that the mean particle size of the metal carried on the carrier is from 1 to 8 nm. It is preferable that the carried amount of the metal is from 10 to 70 parts by weight per 100 parts by weight the carrier.

The hydrogen ion conductive polymer electrolyte is preferably a perfluorocarbonsulfonic acid represented by, for example, the following structural formula:

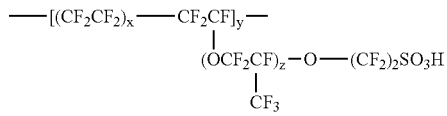

wherein:

$5 \leq x \leq 13.5$ $y \approx 1000$ $1 \leq Z$

The above-mentioned catalyst layer can be obtained by alternately applying an ink containing the catalyst particles and an ink containing a hydrogen ion conductive polymer electrolyte onto the surface of the gas diffusion layer or the hydrogen ion conductive polymer electrolyte membrane. However, in order not to return to the same result that the hydrogen ion conductive polymer electrolyte membrane is thickened, it is necessary to design the catalyst layer in such a manner that the layer comprising a hydrogen ion conductive polymer electrolyte is not in contact with the hydrogen ion conductive polymer electrolyte membrane.

Porous conductive base materials such as carbon paper, carbon cloth and carbon felt are used as the gas diffusion layer. Further, as the hydrogen ion conductive polymer electrolyte membrane, those that have conventionally been utilized may be used.

According to the above-mentioned method, if a water repellent such as a fluorocarbon resin or a carbon powder which is made water repellent by fluorocarbon resin is mixed in the ink containing the catalyst particles, a large amount of the hydrogen ion conductive polymer electrolyte is prevented from adsorbing on the surface of the water repellent. Therefore, the catalyst particles can be in contact with the hydrogen ion conductive polymer electrolyte evenly and sufficiently.

The total number of layers comprising catalyst particles and layers comprising a hydrogen ion conductive polymer electrolyte is preferably as small as 2 from the viewpoint of reducing the production cost. Likewise, it is preferably from 3 to 10 from the viewpoint of enlarging the reaction area as well as obtaining a high performance electrode.

For the applying method, such method is preferable that an ink is sprayed on the surface of a gas diffusion layer or a hydrogen ion conductive polymer electrolyte membrane.

For the organic solvent serving as the dispersion medium of the ink, alcohols such as methanol, ethanol, propanol, butanol, 1-propanol, 2-methyl-1-propanol, 2-methyl-2-propanol; butyl acetate; tetrahydrofuran and the like are preferable. These may be used singly, or in combination of two or more thereof.

The preferred conditions for the spray application are nozzle diameter of 1 mm or less, spraying pressure of from $3.0 \times 10^5$ to $10 \times 10^5$ Pa, the distance between the nozzle tip and the surface of the gas diffusion layer or that of the hydrogen ion conductive polymer electrolyte membrane of 100 mm or less.

The thickness of the layer comprising catalyst particles is preferably from 10 to 10000 nm per layer from the viewpoint of improving the electrode performance. Likewise, the thickness of the layer comprising a hydrogen ion conductive polymer electrolyte is preferably from 10 to 10000 nm per layer. From the same viewpoint, the amount of the catalyst particles contained in the layer comprising catalyst particles per layer and per unit area is preferably from 0.005 to 1.0 mg/cm$^2$, and the amount of the hydrogen ion conductive polymer electrolyte contained in the layer comprising a hydrogen ion conductive polymer electrolyte per layer and per unit area is preferably from 0.01 to 4 mg/cm$^2$.

Embodiment 2

The amount of the hydrogen ion conductive polymer electrolyte contained in a catalyst layer in accordance with the present embodiment decreases toward the gas diffusion layer side from the hydrogen ion conductive polymer electrolyte membrane side.

The above-mentioned catalyst layer can be formed by preparing a plurality of inks having different mixing ratios of catalyst particles to a hydrogen ion conductive polymer electrolyte, and alternately applying the plurality of inks onto the surface of the gas diffusion layer or the hydrogen ion conductive polymer electrolyte membrane. The components of the inks are catalyst particles, a hydrogen ion conductive polymer electrolyte, a water repellent, a carbon powder which is made water repellent and the like. These may be contained in the inks singly or in combination of two or more thereof.

For the applying method, such method is preferable that the inks are sprayed onto the surface of the gas diffusion layer or the hydrogen ion conductive polymer electrolyte membrane. Further, it is preferable that the plurality of inks having different mixing ratios of catalyst particles to a hydrogen ion conductive polymer electrolyte are sprayed from different nozzles respectively.

In the above-mentioned method, inks are atomized and sprayed onto the surface of the gas diffusion layer or the hydrogen ion conductive polymer electrolyte membrane; as a result, most of the solvent in the inks are vaporized before the atomized inks are adhered onto the surface of the gas diffusion layer or the hydrogen ion conductive polymer electrolyte membrane. Therefore, the inks do not spread easily on the surface of the gas diffusion layer or the hydrogen ion conductive polymer electrolyte membrane, and the catalyst particles are adhered so that they are sedimented.

For example, it is preferable that while two kinds of inks are sprayed simultaneously from different directions (opposite directions, for example), the gas diffusion layer or the hydrogen ion conductive polymer electrolyte membrane is moved from one nozzle side to the other nozzle side. This method allows the amount of the hydrogen ion conductive polymer electrolyte in the catalyst layer to seamlessly vary in a thickness direction of the catalyst layer.

If the amount of the polymer electrolyte is seamlessly decreased toward the gas diffusion layer side from the polymer electrolyte membrane side, the distribution of the polymer electrolyte turns into a distribution similar to the dendritic structure extended toward the gas diffusion layer side from the polymer electrolyte membrane side; therefore, ions and electrons can move smoothly in the thickness direction of the catalyst layer.

Embodiment 3

The porosity of the gas diffusion layer of the present embodiment is high at the electroconductive separator side and low at the catalyst layer side. Such a structure allows the hydrogen ion conductive polymer electrolyte within the catalyst layer to wet in a proper degree and excessive water within the electrode to be rapidly delivered to outside, and also permits an excellent fuel cell to be obtained in which the gas diffusion layer does not easily lose its shape.

The aforementioned gas diffusion layer can be obtained by laminating a plurality of porous conductive base materials each having different porosities such that a porous conductive base material having a larger porosity comes to the electroconductive separator side and a porous conductive base material having a low porosity comes to the catalyst layer side. Carbon paper, carbon cloth, carbon felt and the like can be used as the porous conductive base material. Herein, one side of the gas diffusion layer, which is in contact with the catalyst layer, is desirably made water repellent. It is effective to make the porous conductive base material disposed at the catalyst layer side water repellent in order to prevent the cathode from drying, when the current density is small or the dew point of the oxidant gas is low.

The gas diffusion layer having a small porosity disposed at the catalyst layer side serves to keep the catalyst layer wet, whereas the gas diffusion layer having a large porosity disposed at outer side serves to rapidly pass the excessive water to the gas channel of the electroconductive separator.

Carbon paper is generally produced by making a sheet of paper out of a polyacrylonitrile type fiber and calcining it at a high temperature of 1000° C. or more. If two sheets of paper of different kinds each having different porosities are laminated and calcined, two sheets of carbon paper of different kinds are obtained that are adhered to each other.

The present invention is described concretely below based on examples. It should be noted, however, that the present invention is not limited to them.

EXAMPLE 1

A carbon powder (Acetylene black, approx. 50 nm mean primary particle size) was immersed in an aqueous solution of chloroplatinic acid, and then was subjected to a reduction treatment, thereby platinum (30 Å mean particle size) was made carried on the surface of the carbon powder. The weight ratio of the carbon powder to the carried platinum was 75:25.

The obtained carbon powder carrying platinum, a dispersion containing 60 wt % polytetrafluoroethylene (trade name: D1, manufactured by DAIKIN INDUSTRIES, Ltd.) and 2-propanol were mixed in a weight ratio of 5:20:75 to obtain an ink A1.

Likewise, perfluorocarbonsulfonic acid serving as a hydrogen ion conductive polymer electrolyte (trade name: Flemion, manufactured by ASAHI GLASS CO., Ltd.) was dispersed in ethanol to obtain an ink B1.

The ink B1 was sprayed on one side of carbon paper having a thickness of 250 µm, which serves as a gas diffusion layer, to form a layer comprising a hydrogen ion conductive electrolyte. Subsequently, the ink A1 was sprayed on the layer comprising a hydrogen ion conductive electrolyte to form a layer comprising catalyst particles.

In the spray, nozzle diameter was set to 0.5 mm, spraying pressure to $5 \times 10^5$ Pa, the distance between the nozzle and the carbon paper to 50 mm.

The thickness of each layer was 10 to 10000 nm respectively. Further, the amounts of platinum and the hydrogen ion conductive polymer electrolyte contained in the catalyst layer having the layer comprising the catalyst particles and the layer comprising the hydrogen ion conductive electrolyte were 0.5 mg/cm$^2$ and 1.2 mg/cm$^2$ respectively.

Figure 2:
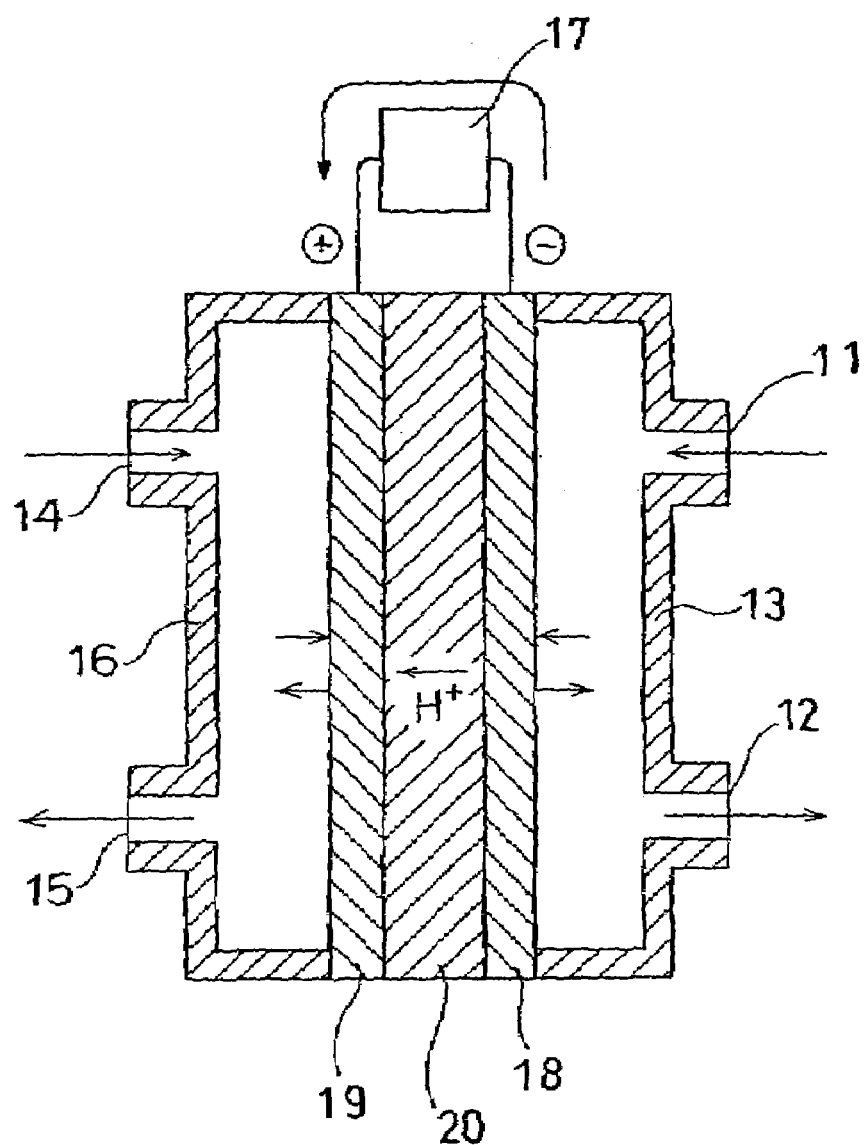
FIG. 2 is a sectional view illustrating a configuration of a unit cell A1 in Example 1 of the present invention.

A unit cell as shown in FIG. 2 was assembled as described below by using the obtained electrode.

First, a pair of electrodes and a hydrogen ion conductive polymer electrolyte membrane 20 (trade name: Nafion 112, manufactured by Du Pont Corp.) were arranged such that the catalyst layers and the hydrogen ion conductive polymer electrolyte membrane 20 were in contact with each other. Then, the hydrogen ion conductive polymer electrolyte membrane 20 was sandwiched between the electrodes and hot-pressed to obtain an electrode-membrane assembly (MEA). One of the electrodes serves as an anode 18, and the other serves as a cathode 19. Outsides of the obtained MEA attached was a hydrogen gas supplying plate 13 having a hydrogen gas supplying inlet 11 and a hydrogen gas exhausting outlet 12, and attached was an oxidant gas supplying plate 16 having an oxidant gas supplying inlet 14 and an oxidant gas exhausting outlet 15. Lastly, the anode and the cathode of the assembly were connected with an external circuit 17, thereby to obtain a unit cell A1.

Figure 3:
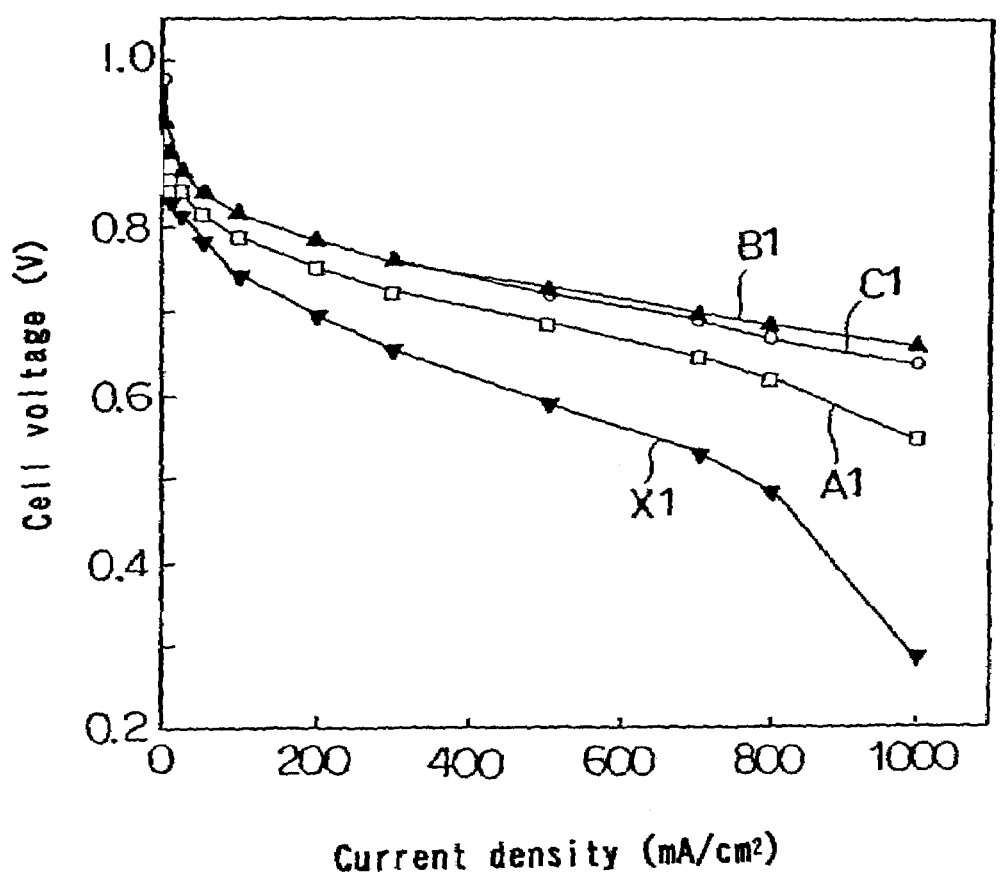
FIG. 3 is a graph showing the current-voltage characteristics of unit cells A1, B1, C1 and X1 in Examples 1 to 3 and Comparative Example 1 of the present invention.

Discharging test was conducted by respectively supplying a hydrogen gas and air to the anode and cathode of the unit cell A1. The cell temperature was set to 75° C., the fuel utilization rate to 80%, and the air utilization rate to 30%. Furthermore, each of the gases was humidified so that the dew point of the hydrogen gas would be 75° C., and the dew point of the air would be 65° C. The current-voltage characteristic of the unit cell A1 is shown in FIG. 3.

EXAMPLE 2

The inks A1 and B1 were alternately sprayed twice each on one side of carbon paper having a thickness of 250 μm to form a catalyst layer. It should be noted that the amounts of platinum and the hydrogen ion conductive polymer electrolyte contained in the catalyst layer were respectively adjusted to 0.5 mg/cm$^2$ and 1.2 mg/cm$^2$, which were the same as those in Example 1. Then, a unit cell B1 shown in FIG. 2 was assembled and discharging test was conducted in the same manner as in Example 1. The current-voltage characteristic of the unit cell B1 is shown in FIG. 3.

EXAMPLE 3

The inks A1 and B1 were alternately sprayed five times each on one side of carbon paper having a thickness of 250 μm to form a catalyst layer. It should be noted that the amounts of platinum and the hydrogen ion conductive polymer electrolyte contained in the catalyst layer were respectively adjusted to 0.5 mg/cm$^2$ and 1.2 mg/cm$^2$, which were the same as those in Example 1. Then, a unit cell C1 shown in FIG. 2 was assembled and discharging test was conducted in the same manner as in Example 1. The current-voltage characteristic of the unit cell C1 is shown in FIG. 3.

COMPARATIVE EXAMPLE 1

An ink C1 was obtained by previously mixing the inks A1 and B1. Then, the ink C1 was sprayed on one side of carbon paper having a thickness of 250 μm to form a catalyst layer. It should be noted that the amounts of platinum and the hydrogen ion conductive polymer electrolyte contained in the catalyst layer were respectively adjusted to 0.5 mg/cm$^2$ and 1.2 mg/cm$^2$, which were the same as those in Example 1. Then, a unit cell X1 shown in FIG. 2 was assembled and discharging test was conducted in the same manner as in Example 1. The current-voltage characteristic of the unit cell X1 is shown in FIG. 3.

FIG. 3 indicates that the characteristics of the unit cells A1, B1 and C1 are significantly excellent as compared with the unit cell X1 despite the amounts of platinum and the hydrogen ion conductive polymer electrolyte contained in the catalyst layer are the same. This is considered to be because the catalyst particles were in contact with the layer comprising a hydrogen ion conductive polymer electrolyte, thereby the reaction area was enlarged and hydrogen ions were transferred with high efficiency. Further, the thickness of the layer comprising a hydrogen ion conductive polymer electrolyte was about from 10 to 10000 nm; which corresponds to the thickness of a monomolecular film. Accordingly, it is conceivable that the hydrogen ion conductive polymer electrolyte permeates into the inside of the micropores of the carbon powder in the catalyst layers of the unit cells A1, B1 and C1. This means that the platinum carried inside of the micropores of the carbon powder was covered with the hydrogen ion conductive polymer electrolyte, contributing to the reaction effectively.

In Examples 1 to 3 and Comparative Example 1, incidentally, the amount of hydrogen ion conductive polymer electrolyte contained in the catalyst layer was 1.2 mg/cm$^2$ but the similar characteristics were also obtained in the range of 0.1 to 3.0 mg/cm$^2$.

EXAMPLE 4

A carbon powder (Acetylene black, approx. 50 nm mean primary particle size) was immersed in an aqueous solution of chloroplatinic acid, and then subjected to a reduction treatment, thereby platinum (30 Å mean particle size) was made carried on the surface of the carbon powder. The weight ratio of the carbon powder to the carried platinum was 75:25.

The obtained carbon powder carrying platinum, an ethanol dispersion containing 9 wt % hydrogen ion conductive polymer electrolyte (trade name: Flemion, manufactured by ASAHI GLASS CO., Ltd.) and 2-propanol were mixed in a weight ratio of 6:50:44, and stirred well using a ball mill to obtain an ink A2.

Likewise, an ethanol dispersion containing 9 wt % hydrogen ion conductive polymer electrolyte (trade name: Flemion, manufactured by ASAHI GLASS CO., Ltd.) and 2-propanol were mixed in a weight ratio of 1:1 to obtain an ink B2.

Figure 4:
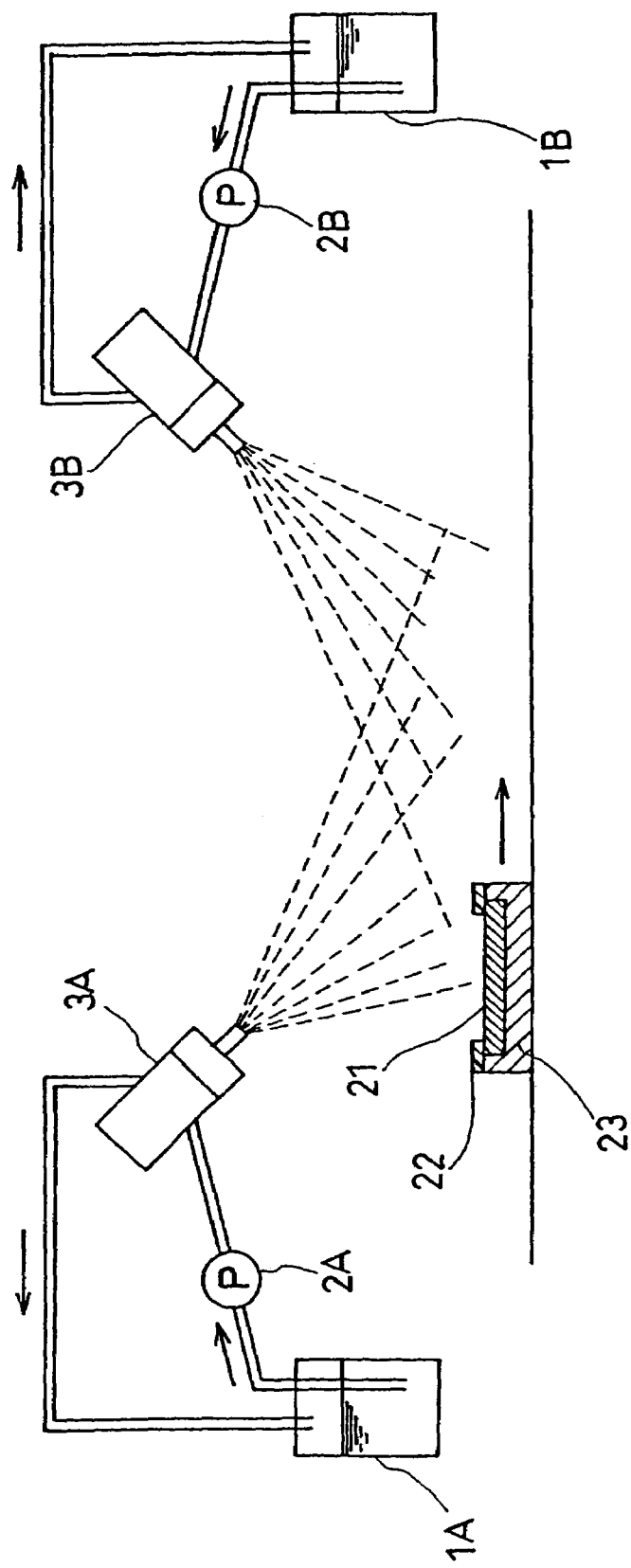
FIG. 4 is a diagram illustrating a configuration of a spray application device used in Example 4 of the present invention.

Next, the inks A2 and B2 were sprayed on one side of carbon paper (trade name: TGPH-120, manufactured by TORAY INDUSTRIES, INC.) as described below by using a spray application device as shown in FIG. 4 to obtain an electrode.

First, the ink A2 was poured into a container 1A and constantly stirred with a stirring blade. Likewise, the ink B2 was poured into a container 1B and constantly stirred with a stirring blade. Then, the ink A2 in the container 1A was introduced with pressure to a nozzle 3A by a pump 2A, and the ink A2 was sprayed from the nozzle 3A in an oblique downward direction. The remaining of the ink A2, which was not sprayed from the nozzle 3A, was circulated to collect in the container 1A. Likewise, the ink B2 in the container 1B was introduced with pressure by a pump 2B to a nozzle 3B placed on the opposite side of the nozzle 3A, and the ink B2 was sprayed from the nozzle 3B in an opposite oblique downward direction to the spraying direction of the ink A2. The remaining of the ink B2, which was not sprayed from the nozzle 3B, was circulated to collect in the container 1B. It should be noted that the tips of the nozzles 3A and 3B were located in the same height, and the distance between the nozzle tips was set to 0.8 m.

Next, carbon paper 21 was placed on a chassis 23, and the chassis 23 was moved to the nozzle 3B side from directly below the nozzle 3A. Incidentally, the moving velocity was set to 1.5 cm/sec., and the vertical length between the nozzle tip and the carbon paper was set to 20 cm. Further, a frame 22 for masking, which was cut into a 60×60 mm square, was disposed on the carbon paper.

An MEA was assembled in the same manner as in Example 1 by using the obtained electrode. The obtained MEA was sandwiched between a pair of electroconductive separators comprising a carbon material. A gas channel having a width of 2 mm and a depth of 1 mm was formed by cutting on the surface, which was supposed to be in contact with the electrode, of each separator. Each separator has a thickness of 4 mm.

Then, a metal end plate (SUS 304) was disposed outside of each separator and manifolds were attached at a pair of facing sides of the MEA via an insulator and a gasket, thereby to obtain a unit cell A2. Then, hydrogen, air and cooling water were supplied and exhausted through the manifold.

Discharging test was conducted by respectively supplying a hydrogen gas and air to the anode and cathode of the unit cell A2. The cell temperature was set to 80° C., the fuel utilization rate was set to 90%, and the air utilization rate was set to 40%. Furthermore, each of the gases was humidified so that the dew point of the hydrogen gas would be 75° C., and the dew point of the air would be 60° C. The current-voltage characteristic of the unit cell A2 is given in FIG. 5.

EXAMPLE 5

The inks A2' and B2' having the same ingredient compositions as the inks A2 and B2 and half amount of the dispersion media of the inks A2 and B2 were prepared. Then, an electrode was produced as described below using the inks A2' and B2' by means of a common screen printing method. The reason why the amount of the dispersion media of the inks was reduced herein was to make the viscosity suitable for the screen printing.

First, the ink A' was printed on carbon paper using a 100-mesh screen. After this was dried at 60° C., the ink B' was screen printed in the same manner as described earlier. Subsequently, it was sufficiently dried at 60° C. to remove the solvent therefrom, thereby obtaining an electrode. After that, a unit cell B2 was obtained in the same manner as in Example 4 by using the obtained electrode. And discharging test was conducted in the same manner as in Example 4. The current-voltage characteristic of the unit cell B2 is shown in FIG. 5.

COMPARATIVE EXAMPLE 2

Only the ink A' was printed on carbon paper using a 100-mesh screen. After that, it was sufficiently dried at 60° C. to remove the solvent therefrom to obtain an electrode. Consequently, a unit cell C2 was obtained in the same manner as in Example 4 using the obtained electrode. Then, discharging test was conducted in the same manner as in Example 4. The current-voltage characteristic of the unit cell C2 is shown in FIG. 5.

Figure 5:
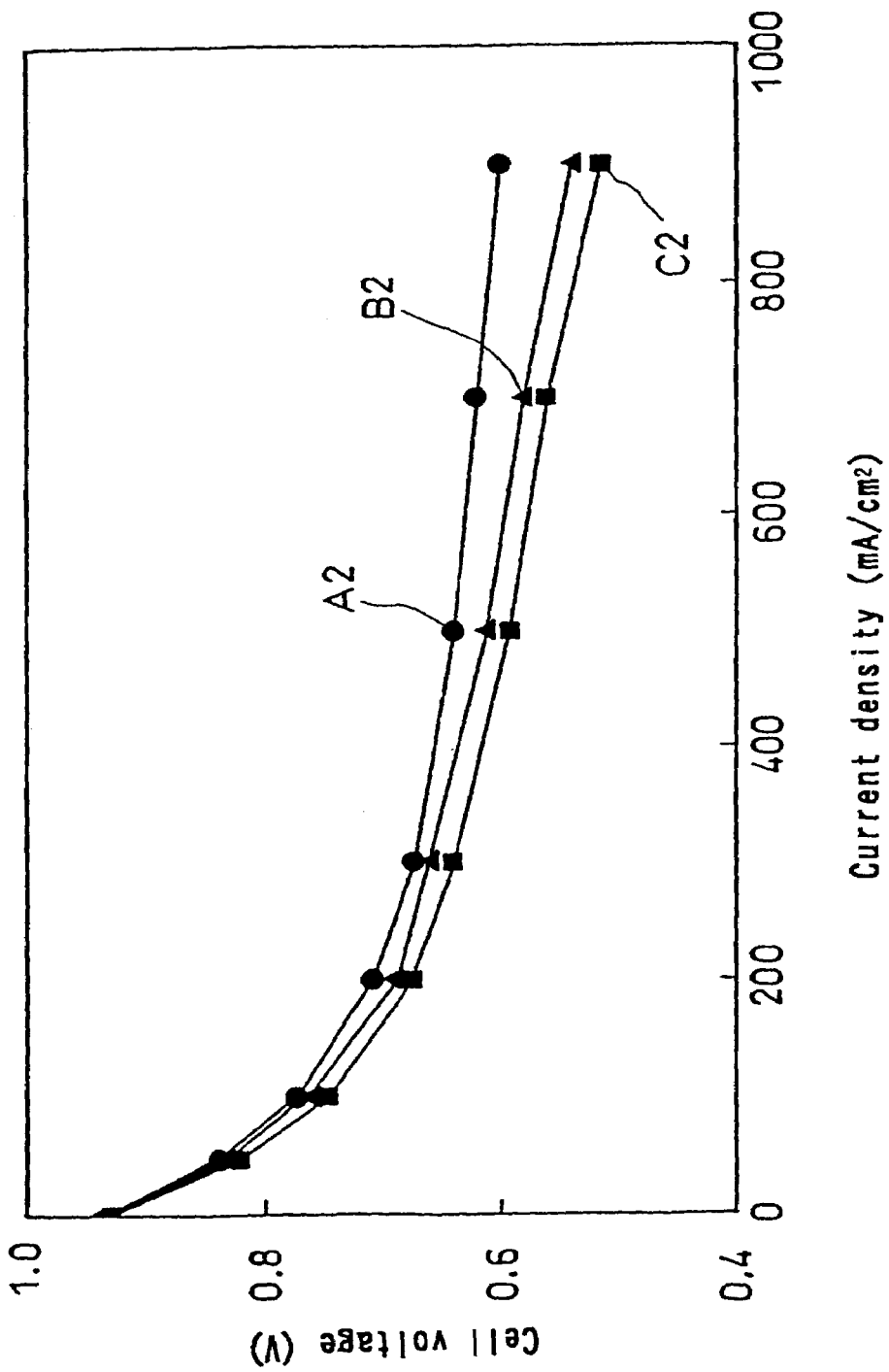
FIG. 5 is a graph showing the current-voltage characteristics of unit cells A2, B2 and C2 in Examples 4 and 5 and Comparative Example 2 of the present invention.

FIG. 5 indicates that the unit cells A2 and B2 are more excellent in characteristics as compared with the unit cell C2.

Schematic sectional views of each electrode of the unit cells A2, B2 and C2 are given in FIG. 6. In FIG. 6, a black dot represents the hydrogen ion conductive polymer electrolyte. FIG. 6 shows that the hydrogen ion conductive polymer electrolyte is gradually decreased in a thickness direction of the electrode toward the carbon paper 25 from the surface of the electrode in the catalyst layer 24 of the unit cell A2. Such a structure can be obtained by spraying two kinds of inks onto carbon paper using a spray application device as shown in FIG. 4. It is considered to be because the amount of the hydrogen ion conductive polymer electrolyte applied on the carbon paper was increased as the carbon paper was moved to the nozzle 3B side.

On the other hand, the catalyst layer 24 of the unit cell B2 is divided into a layer 26 having a large amount of the ion conductive polymer electrolyte and a layer 27 having a small amount of the ion conductive polymer electrolyte. Further, it can be seen that the hydrogen ion conductive polymer electrolyte is distributed evenly in the whole catalyst layer 24 of the unit cell C2.

These results prove that the electrode in which the amount of a hydrogen ion conductive polymer electrolyte in the catalyst layer is large at the hydrogen ion conductive polymer electrolyte membrane side and is small at the gas diffusion layer side has excellent characteristic as compared with conventional electrodes.

It should be noted that a spray application method was used in Example 4 as a method for making the amount of the hydrogen ion conductive polymer electrolyte seamlessly varied in the thickness direction but methods other than this can also be used.

When the amount of a hydrogen ion conductive polymer electrolyte in the catalyst layer is made varied in the thickness direction, for example, the amount of the hydrogen ion conductive polymer electrolyte may be small at the hydrogen ion conductive polymer electrolyte membrane side and large at the gas diffusion layer side contrary to Example 4 from the view point of providing corrosion resistance against CO.

EXAMPLE 6

A carbon powder (Acetylene black, approx. 50 nm mean primary particle size) was immersed in an aqueous solution of chloroplatinic acid, and then subjected to a reduction treatment, thereby platinum (30 Å mean particle size) was made carried on the surface of the carbon powder. The weight ratio of the carbon powder to the carried platinum was 75:25.

The obtained carbon powder carrying platinum, a carbon powder carrying 5 wt % polytetrafluoroethylene, an ethanol dispersion containing 9 wt % polymer electrolyte (trade name: Flemion, manufactured by ASAHI GLASS CO., Ltd.) and 2-propanol were mixed in a weight ratio of 6:3:50:41, and stirred well using a ball mill to obtain an ink C2.

Likewise, a carbon powder carrying 5 wt % polytetrafluoroethylene, an ethanol dispersion containing 9 wt % polymer electrolyte (trade name: Flemion, manufactured by ASAHI GLASS CO., Ltd.) and 2-propanol were mixed in a weight ratio of 3:50:47 to obtain an ink D2.

Next, an electrode was produced in the same manner as in Example 4 by using the spray application device to obtain a unit cell D2. Then, the same discharging test as Example 4 was conducted. The current-voltage characteristic of the unit cell D2 is shown in FIG. 7.

Figure 7:
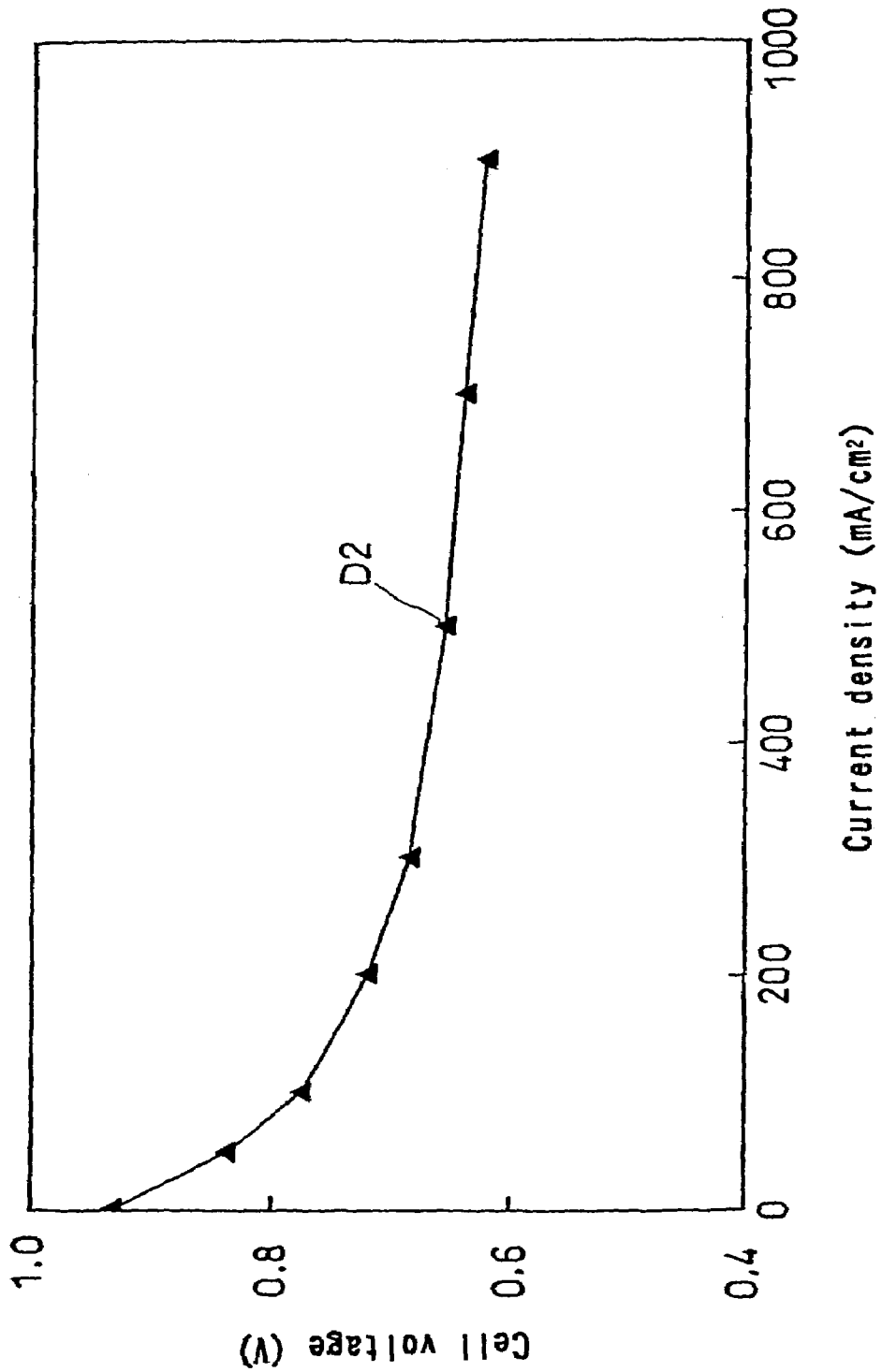
FIG. 7 is a graph showing the current-voltage characteristics of a unit cell D2 in Example 6 of the present invention.

FIG. 7 indicates that the unit cell D2 is more excellent in characteristic as compared with the unit cell A2. This is considered to be because the water generated in the catalyst layer was efficiently exhausted since the carbon powder which had been made water repellent with polytetrafluoroethylene was contained in the catalyst layer.

EXAMPLE 7

A carbon powder (approx. 50 nm mean primary particle size) was immersed in an aqueous solution of chloroplatinic acid, and then subjected to a reduction treatment, thereby platinum was made carried on the surface of the carbon powder. The weight ratio of the carbon powder to the carried platinum was 1:1.

The obtained carbon powder carrying 50 wt % of platinum, an ethanol dispersion containing 9 wt % polymer electrolyte (trade name: Flemion, manufactured by ASAHI GLASS CO., Ltd.) and 2-propanol were mixed in a weight ratio of 6:50:44, and stirred well using a ball mill to obtain a slurry A3.

Figure 8:
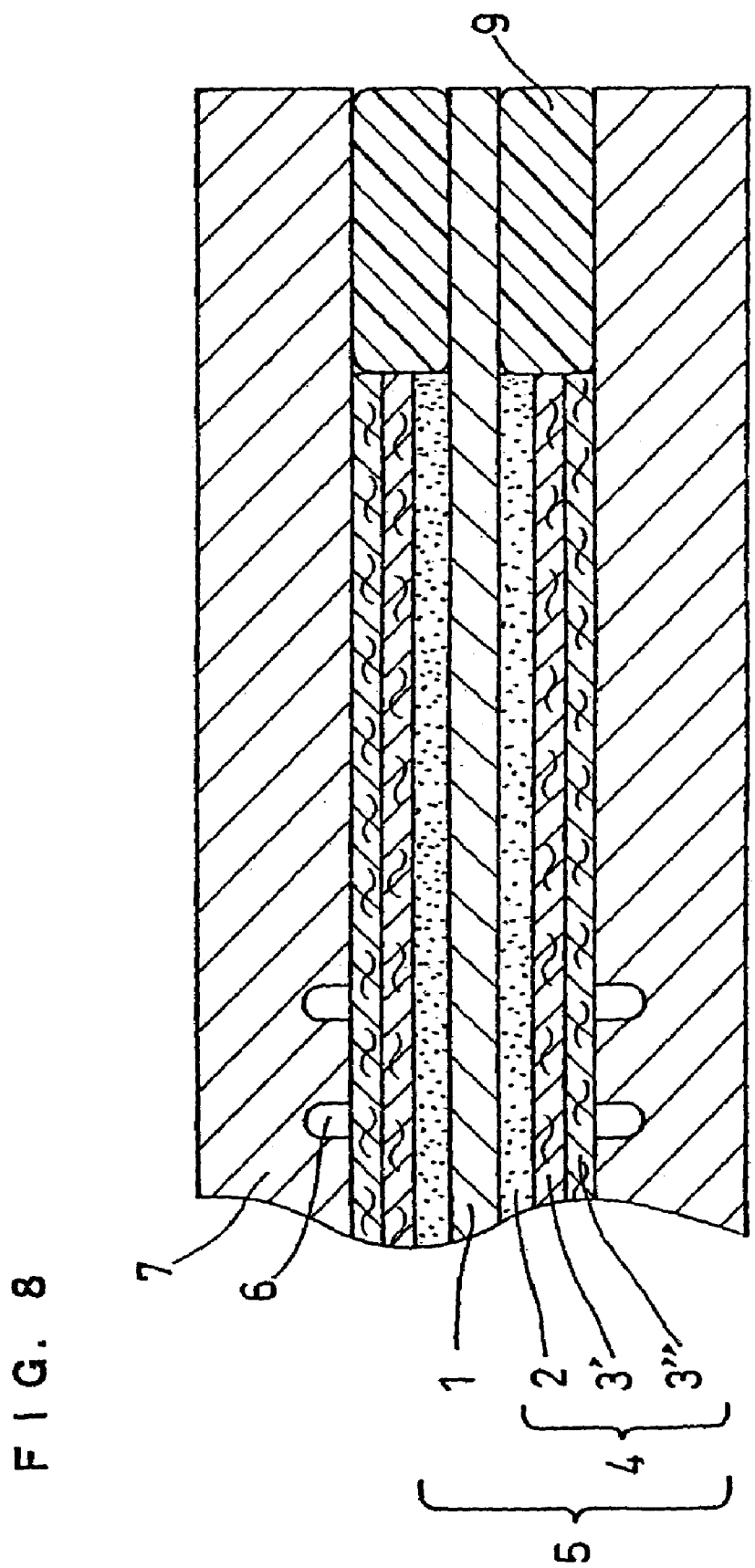
FIG. 8 is a sectional view illustrating a configuration of a unit cell of a fuel cell A3 in Example 7 of the present invention.

Next, a unit cell shown in FIG. 8 was constituted as described below.

First, carbon paper having a thickness of 180 µm, a length of 20 cm, a width of 10 cm and a porosity of 75% was prepared, and the slurry A3 was applied evenly on one side of the carbon paper to form a catalyst layer 2; thereby an electrode precursor was obtained. Then, a hydrogen ion conductive polymer electrolyte membrane 1 (trade name: Nafion 112, manufactured by Du Pont Corp.), which was one size larger than the electrode precursor, was sandwiched between a pair of the electrode precursors such that the catalyst layer and the hydrogen ion conductive polymer electrolyte membrane were in contact. Then, silicon rubber gaskets 9 having a thickness of 250 µm were disposed on both sides of the protruded portion of the hydrogen ion conductive polymer electrolyte membrane from the electrode; subsequently it was hot pressed at 130° C. for 5 minutes to obtain an MEA precursor. Finally, carbon paper 3" having a thickness of 180 µm, a length of 20 cm, a width of 10 cm and a porosity of 90% was placed outside of carbon paper 3' of the MEA precursor to obtain an MEA 5.

Next, electroconductive separators 7 were attached outsides of the carbon paper 3" of the MEA to obtain a unit cell. Then, the same four unit cells were laminated to form a stack cell. The electroconductive separators were made of a carbon material, and had a thickness of 4 mm and gas tightness. Further, a gas channel 6 having a width of 2 mm and a depth of 1 mm was formed by cutting on the surface, which was supposed to be in contact with the carbon paper 3", of the electroconductive separators.

Figure 9:
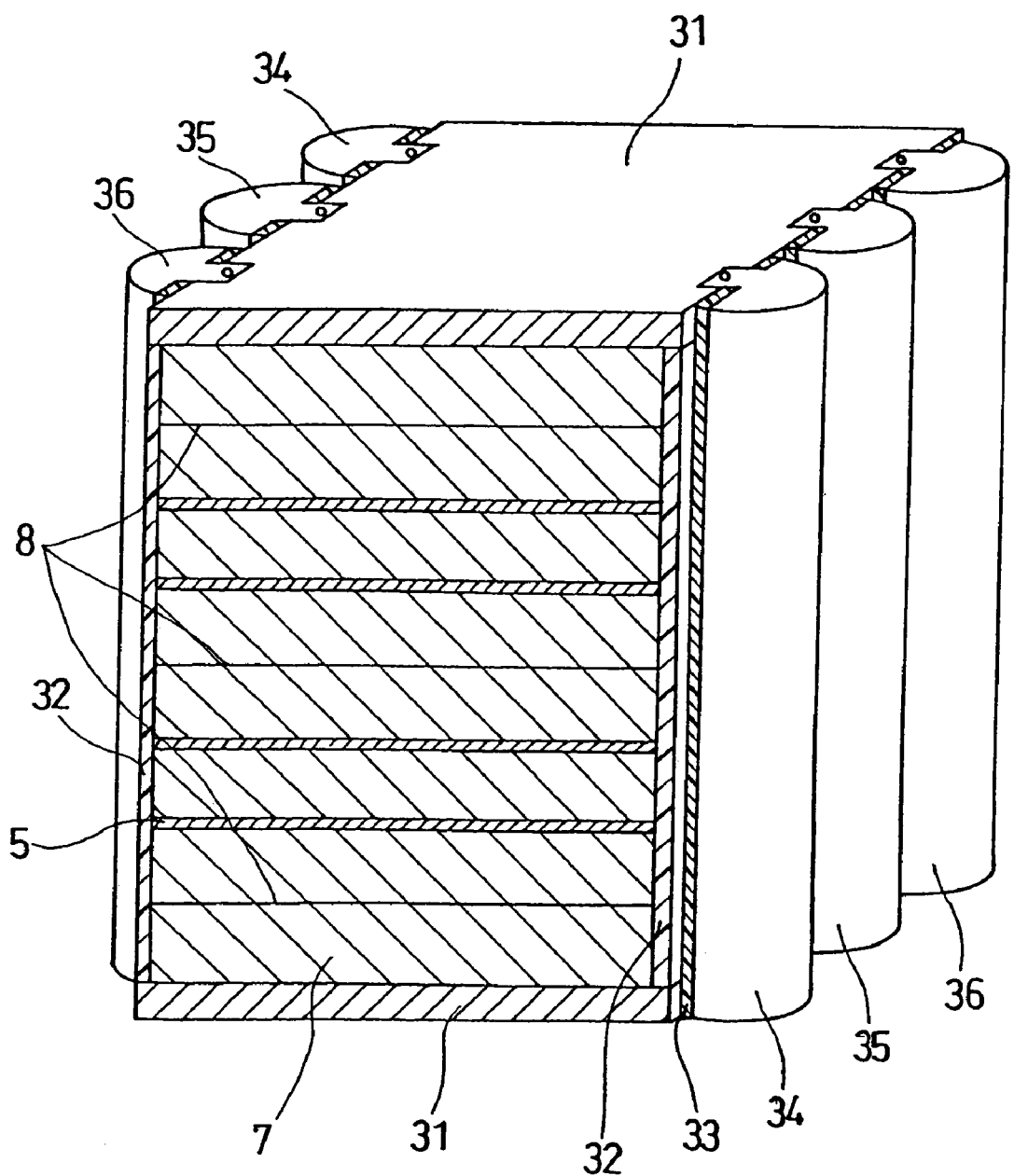
FIG. 9 is a partially cross sectional oblique view illustrating a configuration of fuel cell A3 in Example 7 of the present invention.

Next, a fuel cell shown in FIG. 9 was assembled. FIG. 9 shows a sectional view close to the front so that the internal structure of the fuel cell can be seen.

First, metal end plates 31 (SUS 304) were disposed on the upper and lower sides of the stack cell, and insulators 32 were disposed at both sides of the stack cell. Next, fuel gas manifolds 34, cooling water manifolds 35 and oxidant gas manifolds 36 were placed in parallel outsides of the insulators 32 via gaskets 33. Then, hydrogen, cooling water and air were respectively supplied through the fuel gas manifolds 34, the cooling water manifolds 35 and the oxidant gas manifolds 36. The obtained fuel cell is represented by a cell A3.

It should be noted that gas channels were formed on both surfaces of the electroconductive separator which was in contact with the MEAs 5 at both surfaces thereof. Likewise, a cooling water channel was formed by cutting on the interface 8 where one electroconductive separator was in contact with the other electroconductive separator.

Figure 10:
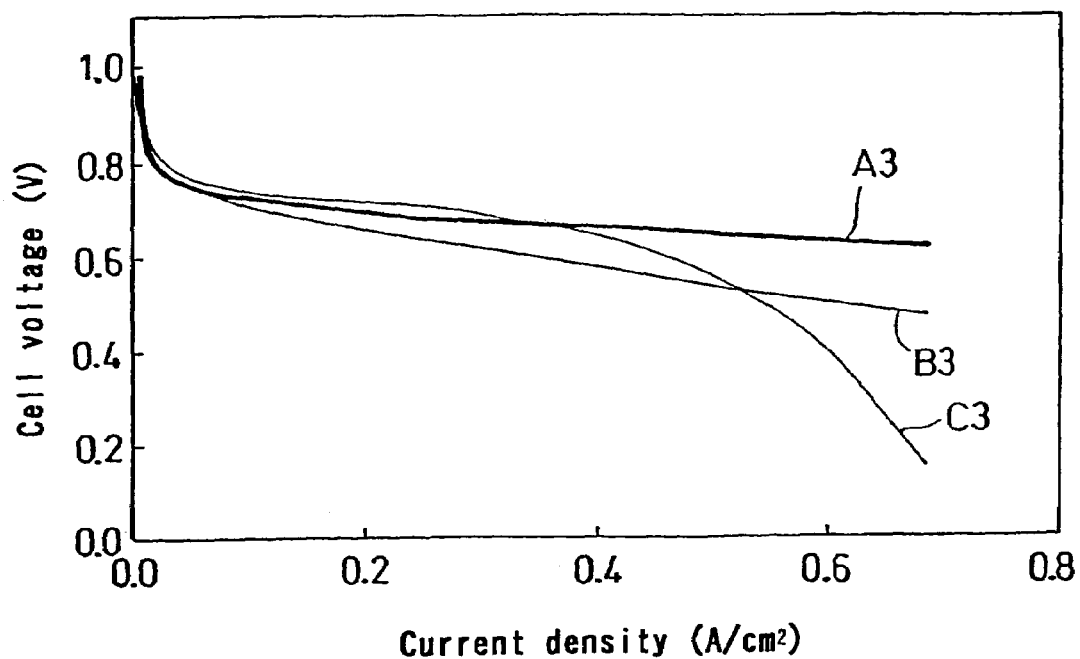
FIG. 10 is a graph showing the current-voltage characteristics of fuel cells A3, B3 and C3 in Example 7 and Comparative Examples 3 and 4 of the present invention.

Discharging test was conducted by respectively supplying a hydrogen gas and air to the anode and cathode of the unit cell A3. The cell temperature was set to 75° C., the fuel utilization rate to 70%, and the air utilization rate to 40%. Furthermore, each of the gases was humidified so that the dew point of the hydrogen gas would be 75° C., and the dew point of the air would be 65° C. The current-voltage characteristic of the fuel cell A3 is shown in FIG. 10.

Figure 11:
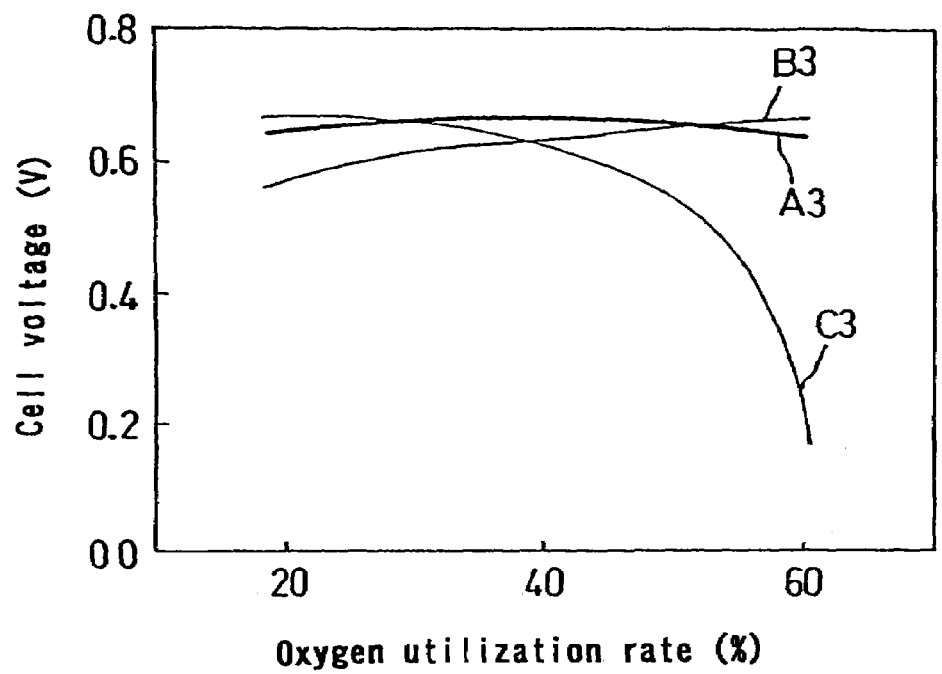
FIG. 11 is a graph showing a relation between oxygen utilization rate and voltage of fuel cells A3, B3 and C3 in Example 7 and Comparative Examples 3 and 4 of the present invention.

Further, the relation between oxygen utilization rate and voltage at a current density of 0.7 A/cm$^2$ was evaluated. The results are shown in FIG. 11.

COMPARATIVE EXAMPLE 3

A fuel cell B3 was assembled and the evaluation was made in the same manner as in Example 7, except that the carbon paper 3" having a porosity of 90% was used singly. The results are given in FIGS. 10 and 11.

COMPARATIVE EXAMPLE 4

A fuel cell C3 was assembled and the evaluation was made in the same manner as in Example 7, except that the carbon paper 3' having a porosity of 75% was used singly. The results are shown in FIGS. 10 and 11.

FIGS. 10 and 11 indicate that the fuel cell A3 is excellent in characteristics as compared with B3 and C3. This is considered to be because the polymer electrolyte of the fuel cell A3 was kept wet and excessive water due to generated water was rapidly delivered.

EXAMPLE 8

A fuel cell D3 was assembled and the evaluation was made in the same manner as in Example 0.7, except that carbon paper having a thickness of 360 µm and a porosity of 90% was used singly as the gas diffusion layer at the anode side and the same gas diffusion layer as that in Example 7, which was made by laminating two sheets of carbon paper of different kinds having different porosities, was employed as the gas diffusion layer at the cathode side which serves to exhaust the generated water. The results are given in FIGS. 12 and 13 along with that of the fuel cell A3.

Figure 12:
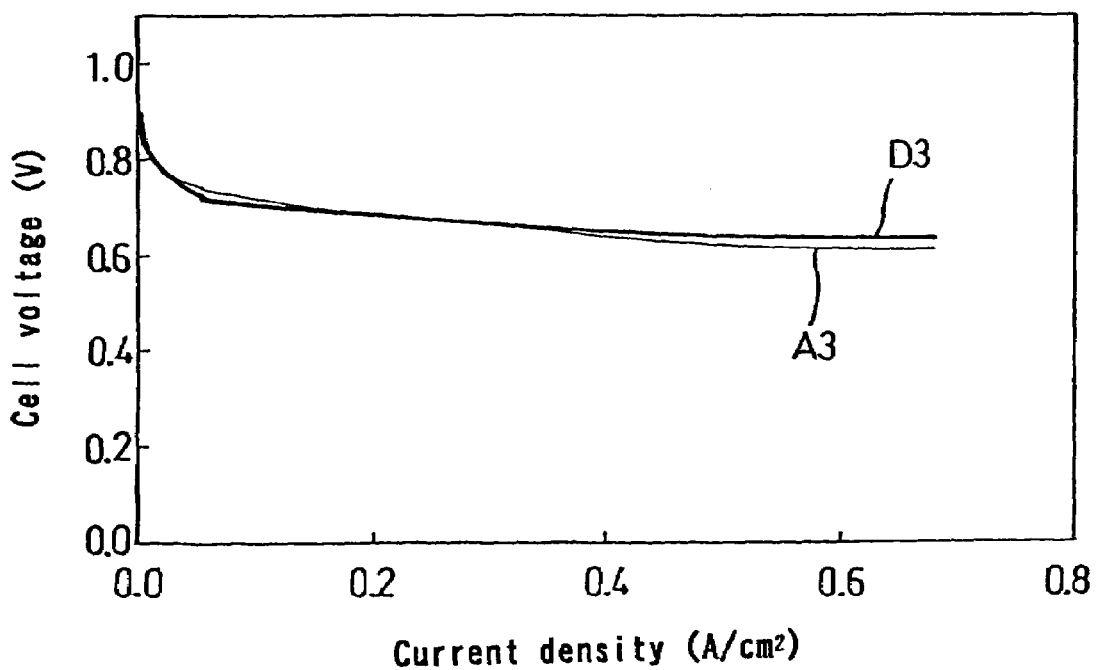
FIG. 12 is a graph showing the current-voltage characteristics of fuel cells A3 and D3 in Examples 7 and 8 of the present invention.
Figure 13:
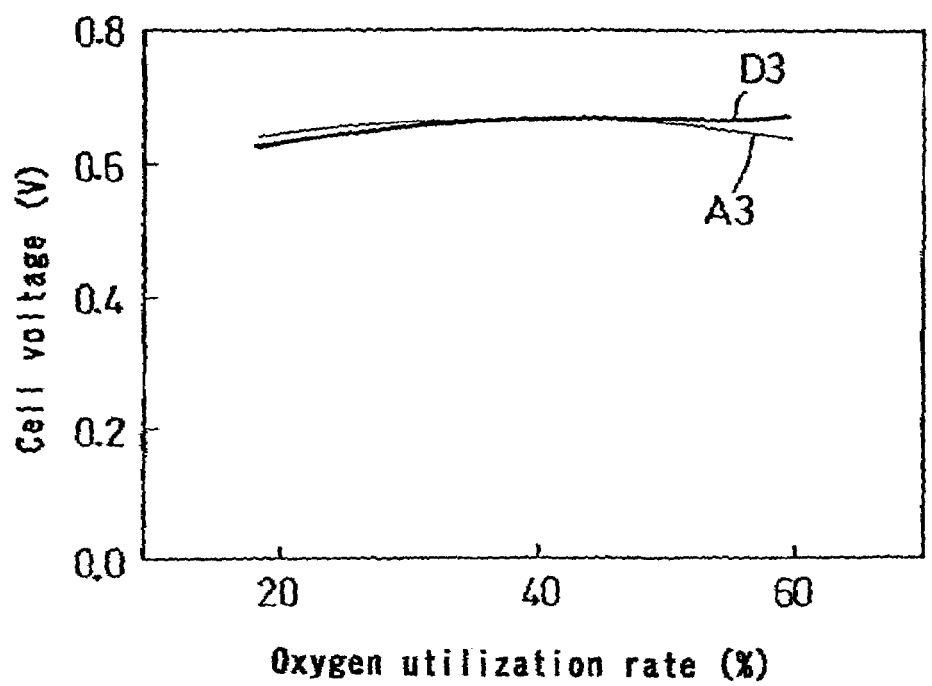
FIG. 13 is a graph showing a relation between oxygen utilization rate and voltage of fuel cells A3 and D3 in Examples 7 and 8 of the present invention.

FIGS. 12 and 13 indicate that the fuel cell D3 also has the similar characteristic as the fuel cell A3.

EXAMPLE 9

Before the slurry containing the carbon powder carrying platinum was applied onto the carbon paper having a porosity of 75%, the catalyst layer side of the carbon paper had been made water repellent. To be specific, carbon paper 3' having a thickness of 180 µm and a porosity of 75%, which was cut into a length of 20 cm and a width of 10 cm, was immersed in an aqueous dispersion containing a copolymer of tetrafluoroethylene and hexafluoropropylene, and then it was heated at 400° C. for 30 minutes to give water repellency to the carbon paper. A fuel cell E3 was assembled in the same manner as in Example 7 except those mentioned above.

Next, the relation between oxygen utilization rate and voltage at a current density of 0.7 A/cm$^2$ was evaluated in the same manner as in Example 7 except that air was humidified so that the dew point at the cathode side would be 50° C. The result is shown in FIG. 14 along with that of the fuel cell A3.

Figure 14:
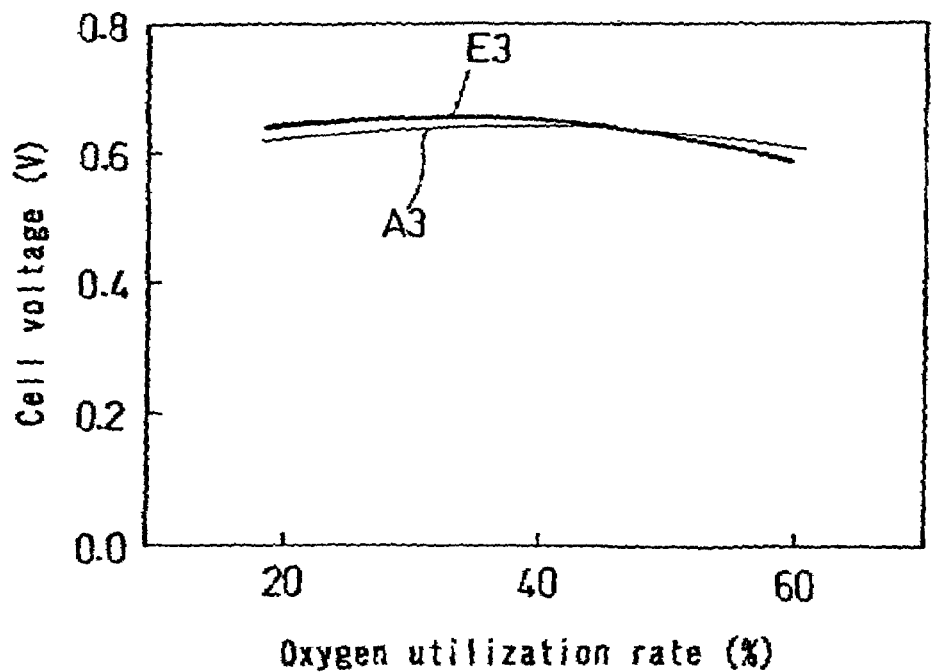
FIG. 14 is a graph showing a relation between oxygen utilization rate and voltage of fuel cells A3 and E3 in Examples 7 and 9 of the present invention.

FIG. 14 suggests that the fuel cell E3 also has the similar characteristic as the fuel cell A3. Further, when the air having a low dew point is supplied, there is fear that the cathode side dries; however, it has been confirmed that the water repellent treatment as mentioned above is effective.

INDUSTRIAL APPLICABILITY

In a polymer electrolyte fuel cell in accordance with the present invention, since at least either of hydrogen ion conductivity and gas permeability of at least either of an anode and a cathode varies in a thickness direction of the anode or the cathode, the reaction area is enlarged and hydrogen ions and electrons can move smoothly in a thickness direction of the catalyst layer; as a result, a hydrogen ion conductive polymer electrolyte membrane in an electrode is kept wet and excessive water due to the generated water is rapidly delivered. Therefore, the present invention can realize a polymer electrolyte fuel cell having excellent characteristics.

What is claimed is:

1. A polymer electrolyte fuel cell comprising:
    a hydrogen ion conductive polymer electrolyte membrane;
    an anode and a cathode sandwiching said hydrogen ion conductive polymer electrolyte membrane;
    an anode side electroconductive separator having a gas channel for supplying a fuel gas to said anode;
    a cathode side electroconductive separator having a gas channel for supplying an oxidant gas to said cathode; characterized in that
    said anode and said cathode comprise a gas diffusion layer and a catalyst layer formed on said gas diffusion layer at the side in contact with said hydrogen ion conductive polymer electrolyte membrane, and
    said catalyst layer has catalyst particles and a hydrogen ion conductive polymer electrolyte,
    wherein the amount of said hydrogen ion conductive polymer electrolyte in said catalyst layer is large at the side of said hydrogen ion conductive polymer electrolyte membrane and is small at the side of said gas diffusion layer, said amount of said hydrogen ion conductive polymer electrolyte varies seamlessly in a thickness direction of said anode or said cathode.

2. The polymer electrolyte fuel cell in accordance with claim 1, wherein the amount of said hydrogen ion conductive polymer electrolyte varies seamlessly in a thickness direction for both said anode and said cathode.

3. The polymer electrolyte fuel cell in accordance with claim 1, wherein the porosity of said gas diffusion layer is high at the side of said electroconductive separator and is low at the side of said catalyst layer.

4. The polymer electrolyte fuel cell in accordance with claim 1, wherein said gas diffusion layer has a plurality of porous conductive base materials each having different porosities.

5. A method for producing the polymer electrolyte fuel cell in accordance with claim 1, comprising
    a step of, by mixing catalyst particles and a hydrogen ion conductive polymer electrolyte with a dispersion medium, preparing a plurality of catalyst-layer-forming inks having different mixing ratios of said catalyst particles to said hydrogen ion conductive polymer electrolyte, and
    a step of forming a catalyst layer in which said hydrogen ion conductivity polymer electrolyte varies seamlessly in a thickness direction, by said plurality of catalyst-layer-forming inks from different nozzles respectively on one side of a gas diffusion layer or at least one side of a hydrogen ion conductive polymer electrolyte membrane.

6. The method for producing the polymer electrolyte fuel cell in accordance with claim 5, wherein said catalyst-layer-forming inks contain carbon particles that are made water repellent.

7. The method for producing the polymer electrolyte fuel cell in accordance with claim 5, comprising a step of forming said gas diffusion layer, in which gas permeability varies in a thickness direction, by laminating a plurality of porous conductive base materials having different porosities.

8. The method for producing the polymer electrolyte fuel cell in accordance with claim 7, comprising a step of making a surface, which is supposed to be in contact with a catalyst layer, of said gas diffusion layer water repellent.

* * * * *

UNITED STATES PATENT AND TRADEMARK OFFICE
CERTIFICATE OF CORRECTION

| | | |
|---|---|---|
| PATENT NO. | : 7,097,932 B1 | Page 1 of 1 |
| APPLICATION NO. | : 10/088484 | |
| DATED | : August 29, 2006 | |
| INVENTOR(S) | : Osamu Sakai et al. | |

It is certified that error appears in the above-identified patent and that said Letters Patent is hereby corrected as shown below:

On the Title page of the Letters Patent,

Under section "(56) Reference Cited, FOREIGN PATENT DOCUMENTS", change,

"EP 0 928 038 A1" to -- EP 0 928 036 A1 -- and change

"EP 0 972 807 A1 10/1998" to -- EP 0 872 907 A1 10/1998 --

Signed and Sealed this

Thirteenth Day of February, 2007

JON W. DUDAS
*Director of the United States Patent and Trademark Office*